3,012,990
MOLDABLE COPOLYMERS
Raymond J. Kray and Charles A. Defazio, Summit, N.J., assignors to Celanese Corporation of America, New York, N.Y., a corporation of Delaware
No Drawing. Filed Mar. 25, 1959, Ser. No. 801,709
13 Claims. (Cl. 260—67)

This invention relates to novel copolymers of high thermal stability and particularly to copolymers of trioxane.

Polyoxymethylene polymers, having recurring

units have been known for many years. They may be prepared by the polymerization of anhydrous formaldehyde or by the polymerization of trioxane which is a cyclic trimer of formaldehyde.

Trioxane may be polymerized to produce a moldable polymer of high thermal stability, particularly in the presence of a boron fluoride-containing catalyst such as a boron fluoride coordinate with an organic compound in which oxygen or sulfur is the donor atom.

It has now been found that useful moldable polymers comprising oxymethylene groups and groups having the formula

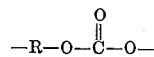

wherein R is an alkylene group, may be obtained by copolymerizing trioxane with an alkylene carbonate.

The preferred alkylene carbonates are those having between about 2 and about 20 carbon atoms in the alkylene group. Among the specific alkylene carbonates which may be used are ethylene carbonate, 1,2-propylene carbonate, 1,3-propylene carbonate, 1,2-butylene carbonate, 1,3-amylene carbonate, tetramethylene carbonate, neopentylene carbonate (2,2-dimethyl,1,3-propanediol carbonate) and carbonates prepared from cycloaliphatic glycols, such as cyclohexane diol and from long chain aliphatic glycols, such as n-dodecane diol 1,2 and 1,3.

The preferred catalysts used in the preparation of the desired copolymers are the boron fluoride coordinate complexes with organic compounds in which oxygen or sulfur is the donor atom and the boron trifluoride gas itself.

The coordinate complexes of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. Boron fluoride dibutyl etherate is also highly desirable. The boron fluoride complexes which may be used include complexes with ethanol, with methanol, with propanol, with butanol, with methyl acetate, with ethyl acetate, with phenyl acetate, with benzoic acid, with acetic anhydride, with acetone, with methylethyl ketone, with dimethyl ether, with methylphenyl ether, with acetaldehyde, with chloral, with dimethyl sulfide and with ethyl mercaptan.

Coordinate complexes of boron fluoride with water, such as boron fluoride monohydrate, boron fluoride dihydrate and boron fluoride trihydrate may also be used.

The coordinate complex of boron fluoride should be present in the polymerization zone in an amount such that its boron fluoride content is between about 0.001 and about 1.0 weight percent based on the weight of trioxane and alkylene carbonate in the polymerization zone. Preferably, amounts between about 0.003 and about 0.1 weight percent should be used.

The trioxane and alkylene carbonate in the reaction zone are preferably anhydrous or substantially anhydrous. Small amounts of moisture, such as may be present in commercial grade feed materials or may be introduced by contact with atmospheric air will not prevent polymerization, but should be removed for best yields.

In one embodiment of this invention the trioxane is polymerized in its molten state with the comonomer and catalyst dissolved therein. The preferred temperature for such polymerization is between about 0° and about 100° C. The period of reaction for such polymerization may vary from about 2 minutes to about 72 hours. Pressures from subatmospheric to about 100 atmospheres, or more, may be used, although atmospheric pressure is preferred.

In another embodiment of this invention, the trioxane, comonomer and catalyst are dissolved in a common anhydrous solvent such as cyclohexane, and permitted to react. The temperature for solution polymerization of this type may vary from about 10° C. to about 85° C. The period of reaction in such polymerization may vary from about ½ hour to about 72 hours. To obtain polymers of exceptionally high molecular weight it is desirable to initiate the polymerization in solution and to then drop the temperature so that most of the trioxane precipitates and to complete the polymerization in solid phase.

In producing the copolymers of this invention the mol ratio of the alkylene carbonate to the trioxane may vary from about 0.005 to about 5 mols of alkylene carbonate per mol of trioxane in the reaction zone. Preferably, the mol ratio may vary from about 0.2 to about 1.5 mols of alkylene carbonate per mol of trioxane.

In the polymer, the alkylene carbonate will be incorporated in mol proportions between about 0.005 and 50 mol percent based on the mols of total monomers. Despite the fact that more mols of alkylene carbonate than of trioxane may be present in the reaction zone, the polymer will generally not contain more because of the lower reactivity of the alkylene carbonate in high concentrations and because of its inability of combine with itself. Preferably, between about 0.5 and 25 mol percent will be incorporated. In the case of ethylene carbonate, the weight percent incorporated is almost identical with the mol percent because of the closeness of the molecular weights.

Upon completion of the polymerization reaction where a relatively large amount of catalyst has been used it is desirable to neutralize the activity of the catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in copending application Ser. No. 718,147, filed February 28, 1958 by Donald E. Hudgin and Frank M. Berardinelli.

*Example I*

Ten grams of ethylene carbonate, 40 grams of trioxane and 0.06 ml. of boron trifluoride diethyl etherate were sealed in a glass tube. The glass tube was placed in a constant temperature bath at 60° C. and rotated end over end (40 r.p.m.) for 72 hours. The polymer was removed from the tube and washed twice with water at 80° C. for 15 minute periods. When dried at 60° C. in a forced draft air oven the polymer weighed 40.5 grams and melted at 179° C. The saponification number of the polymer was determined as 1.6 milligram equivalents of KOH per gram of polymer. The saponification value indicated that 6 mol percent of carbonate was incorporated in the polymer molecule. The polymer had a melting point of 179° C. and an inherent viscosity of 0.57 measured in 0.1% solution in p-chlorophenol containing 2 weight percent of γ-pinene at 60° C.

*Example II*

240 grams of trioxane, 240 grams of cyclohexane and 20 grams of ethylene carbonate were heated to 58° C. and 0.105 ml. of boron fluoride dibutyl etherate in 9 ml. of cyclohexane was added. The solution was then transferred to a stainless steel beaker and placed in a cold water bath at 11° C. for one hour. The solution temperature rose to 85° C. within two minutes by the exothermic heat of reaction and then dropped slowly to 21° C. by the end of the hour. The polymer was pulverized and washed twice with hot water at 90 to 95° C. It was then dried at 65 to 70° C. The yield of polymer was 161 grams of 67 percent of theoretical. The polymer had an inherent viscosity of 0.95 when measured as above. White discs were molded from the polymer at 190° C. for four minutes.

*Example III*

249 grams of trioxane, 249 grams of cyclohexane and 2 grams of ethylene carbonate were heated to 58° C. and 1.105 ml. of boron fluoride dibutyl etherate in 9 ml. of cyclohexane was added. The solution was poured into a stainless steel beaker and placed in a cold water bath at 10° C. for 53 minutes. The solution temperature dropped to 32° C. during this period. The polymer was pulverized and washed at 90 to 95° C. and then dried at 65 to 70° C. The yield was 111 grams of 45% of theoretical. The polymer had an inherent viscosity of 2.36 when measured as above. A white disc was molded at 190° C. for 4 minutes.

*Example IV*

Trioxane, 103 g. was dissolved in 155 grams of ethylene carbonate and the solution cooled to 15° C. Boron trifluoride gas was passed through the solution for an instant and then the reaction mixture was placed in a refrigerator at −3° C. for 17 hours. The polymer was then washed three times with methanol in a Waring Blendor to remove catalyst and monomer residues. The polymer was then dried at 60° C. to give a 7.6% yield of product melting at 166–171° C. and having a saponification number of 1.7. This corresponds to a copolymer containing 8% ethylene carbonate and 92% trioxane, by weight. Infra-red examination showed the presence of carbonyl groups. The inherent viscosity of this copolymer was 0.58 (when measured as above).

*Example V*

Trioxane, 149.5 g., was dissolved in 150 g. of ethylene carbonate at 62° C. and 0.1 ml. of boron trifluoride dibutyl etherate catalyst was added to the solution. Within 5 minutes the solution exothermed slightly and became cloudy. The polymerization mixture was then placed in the refrigerator at −3° C. for 17 hours. The polymer was then washed three times with methanol in a Waring Blendor to remove catalyst and monomer residues. The polymer was then dried at 60° C. to give a 41% yield of product melting at 169–179° C. and having a saponification number of 2.2. This corresponds to a copolymer containing 10% ethylene carbonate and 90% trioxane, by weight. Infra-red examination showed the presence of carbonyl groups.

*Example VI*

Trioxane, 35 grams was dissolved in 33 g. of ethylene carbonate at 60° C. and the solution cooled to room temperature and poured into a glass tube. Boron trifluoride dibutyl etherate catalyst, 0.1 ml. was then added to the tube which was then sealed. The sealed tube was placed in a constant temperature bath at 60° C. and rotated end over end (40 r.p.m.) for 19 hours. The polymer was removed from the tube and washed three times with methanol. The product when dried at 60° C. weighed 25.5 g. (37.5% yield), melted at 160–172° C. and had a saponification number of 3.84. This corresponds to a copolymer containing 21% ethylene carbonate and 79% trioxane, by weight. Infra-red examination showed the presence of carbonyl groups. The inherent viscosity of this copolymer was 0.32 when measured as above.

It is to be understood that the foregoing detailed description is given merely by way of illustration and that many variations may be made therein without departing from the spirit of our invention.

Having described our invention what we desire to secure by Letters Patent is:

1. A copolymer consisting essentially of recurring oxymethylene groups and 0.005 to 50 mol percent of recurring groups of the formula $$-R-O-\overset{O}{\underset{\|}{C}}-O-$$

wherein R is an alkylene group having 2 to 20 carbon atoms.

2. A copolymer consisting essentially of recurring oxymethylene groups and recurring groups of the formula $$-R-O-\overset{O}{\underset{\|}{C}}-O-$$

wherein R is an alkylene group having 2 to 20 carbon atoms.

3. A copolymer consisting esentially of recurring oxymethylene groups and recurring groups of the formula $$-CH_2-CH_2-O-\overset{O}{\underset{\|}{C}}-O-$$

4. A copolymer consisting essentially of recurring oxymethylene groups and 0.005 to 50 mol percent of recurring groups of the formula $$-CH_2-CH_2-O-\overset{O}{\underset{\|}{C}}-O-$$

5. A method of preparing a moldable polymer which comprises copolymerizing a mixture of trioxane and from 0.005 to 5 mols of an alkylene carbonate per mol of trioxane, said alkylene carbonate having from 2 to 20 carbon atoms in its alkylene group.

6. A method of preparing a moldable polymer which comprises copolymerizing trioxane and 0.005 to 5 mols of ethylene carbonate per mol of trioxane.

7. A method of preparing a moldable polymer which comprises polymerizing trioxane and 0.005 to 5 mols of an alkylene carbonate per mol of trioxane in contact with a catalyst comprising a boron fluoride coordinate complex with an organic compound in which oxygen is the donor atom, said alkylene carbonate having from 2 to 20 carbon atoms in its alkylene group.

8. A method of preparing a moldable polymer which comprises polymerizing trioxane and 0.005 to 5 mols of an alkylene carbonate per mol of trioxane in contact with a catalyst comprising gaseous boron fluoride, said alkylene carbonate having from 2 to 20 carbon atoms in its alkylene group.

9. A method of preparing a moldable polymer which comprises maintaining trioxane and from 0.005 to 5 moles of alkylene carbonate having 2 to 20 carbon atoms in its alkylene group per mole of trioxane in contact with a catalyst selected from the group consisting of boron fluoride, boron fluoride coordinate complexes with water and boron fluoride coordinate complexes with organic compounds in which the donor atom is selected from the group consisting of oxygen and sulfur atoms, at a temperature between about 0 and about 100° C., until a solid polymer is formed, said catalyst being present in said polymerization zone in amounts from about 0.001 to 1.0 weight percent based on its boron fluoride content and the weight of trioxane and alkylene carbonate.

10. The method of claim 9 wherein said alkylene carbonate is ethylene carbonate.

11. A copolymer of trioxane and an alkylene carbonate having from 2 to 20 carbon atoms in its alkylene group.

12. A copolymer of trioxane with from 0.005 to 5 mols of an alkylene carbonate per mol of trioxane, said alkylene carbonate having 2 to 20 carbon atoms in its alkylene group.

13. A copolymer of trioxane and ethylene carbonate.

References Cited in the file of this patent

UNITED STATES PATENTS 2,373,561     Hanford     Apr. 10, 1945